United States Patent
Nallet

(10) Patent No.: US 12,519,639 B2
(45) Date of Patent: Jan. 6, 2026

(54) SYSTEM FOR SECURE WIRE VERIFICATION AND INFORMATION SHARING

(71) Applicant: Safe Wire, LLC, Dover, DE (US)

(72) Inventor: Olivier Nallet, San Mateo, CA (US)

( * ) Notice: Subject to any disclaimer, the term of this patent is extended or adjusted under 35 U.S.C. 154(b) by 131 days.

(21) Appl. No.: 18/499,318

(22) Filed: Nov. 1, 2023

(65) Prior Publication Data
US 2024/0413992 A1    Dec. 12, 2024

Related U.S. Application Data

(60) Provisional application No. 63/472,534, filed on Jun. 12, 2023.

(51) Int. Cl.
*H04L 9/30* (2006.01)
*H04L 9/08* (2006.01)
*H04L 9/32* (2006.01)
*H04L 9/40* (2022.01)

(52) U.S. Cl.
CPC ............. *H04L 9/30* (2013.01); *H04L 9/0869* (2013.01); *H04L 9/3218* (2013.01); *H04L 63/0428* (2013.01)

(58) Field of Classification Search
CPC . H04L 9/0869; H04L 9/30; H04L 9/50; H04L 9/3218; H04L 9/3226; H04L 63/0428; H04L 63/1483
USPC ........................................................ 713/155
See application file for complete search history.

(56) References Cited

U.S. PATENT DOCUMENTS

| | | | | |
|---|---|---|---|---|
| 8,726,009 | B1* | 5/2014 | Cook | H04L 9/083 713/168 |
| 8,904,181 | B1* | 12/2014 | Felsher | H04L 9/0841 380/282 |
| 10,686,771 | B2* | 6/2020 | Kärkkäinen | H04L 63/08 |
| 11,556,959 | B2* | 1/2023 | Fournier | H04L 9/3247 |
| 12,093,426 | B2* | 9/2024 | LaFever | H04L 9/3297 |
| 2011/0208965 | A1* | 8/2011 | Machani | H04L 9/0891 713/168 |
| 2017/0091474 | A1* | 3/2017 | Boire-Lavigne | H04L 9/0861 |
| 2017/0206523 | A1* | 7/2017 | Goeringer | G06Q 20/409 |
| 2018/0005238 | A1* | 1/2018 | Hammad | G06Q 20/425 |
| 2018/0307859 | A1* | 10/2018 | LaFever | H04L 63/20 |
| 2019/0332807 | A1* | 10/2019 | LaFever | H04L 63/0407 |
| 2021/0390585 | A1* | 12/2021 | Fournier | H04L 9/3247 |
| 2023/0054446 | A1* | 2/2023 | LaFever | H04W 12/75 |
| 2023/0095123 | A1* | 3/2023 | Fournier | G06F 21/6245 713/176 |

* cited by examiner

*Primary Examiner* — Samson B Lemma

(57) ABSTRACT

A method of using the system for secure wire verification and information sharing. The method includes executing a preliminary transaction wherein at least one datum is used in the preliminary transaction wherein the at least one datum is known by the sharing party and the receiving party and wherein the at least one datum is absent from the verification system. The method includes initiating a primary transaction and generating a URL associated to a public key. The method includes the delivery system requesting the primary transaction and the receiving party confirming accuracy of the at least one datum. The method includes providing at least one additional layer of security and allowing the primary transaction to occur. The method also includes sharing information securely between the two parties.

17 Claims, 4 Drawing Sheets

SYSTEM FOR SECURE WIRE VERIFICATION AND INFORMATION SHARING

REFERENCE TO RELATED APPLICATIONS

This application is a Non-Provisional Utility Patent application claiming priority to U.S. Provisional Patent application Ser. No. 63/472,534, filed on Jun. 12, 2023, the application of which is incorporated by reference herein in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Trademarks used in the disclosure of the invention, and the applicants, make no claim to any trademarks referenced.

BACKGROUND OF THE INVENTION

1) Field of the Invention

This invention relates to the field of fraud prevention and, more specifically, to a system which maintains security in shared information.

2) Description of Related Art

Wire fraud is not uncommon. Wire fraud is often targeted at future homeowners and investors wanting to purchase a property. Thieves are sending fraudulent wire information through emails, texts, and phone calls, spoofing the title company. The future homeowners then wire the amount dedicated to closing to the fraudulent bank account, and the money is lost, and the property ends up not being purchased.

Potential wire fraud is a cause of stress for most title companies and home buyers. Fraud is also increasing. In 2021 alone, the FBI received 19,954 complaints of business email compromise (BEC) with an adjusted loss of nearly $2.4 billion. This is only a subset of the frauds in the US. Similar stories are happening in the rest of the world. Much wire fraud stems from compromised emails from title companies and/or phishing attempts. As these companies are known to send and receive a lot of funds, it becomes an easy target to take over email accounts and send fraudulent wire information to customers. It does not matter whether the wire information is sent directly or indirectly through a portal. A compromised email can imitate a legit email and point to some fraudulent wire information that looks legitimate.

To make the fraud appear more believable, some fraudsters can even find and re-use existing closing amounts, so the home buyers believe the email is the one they were looking for.

Companies receiving funds from wires need to educate their customers and make sure that the customers are in the habit of verifying the wire information through other mechanisms. But this has limitations too. There have been some cases where the phone number provided was also incorrect, and the thief would be the one to verify the fraudulent information by phone.

In another example of a problem in wire transfers, customers should be educated about wire fraud and good practices to prevent them. As shared, the customers should be incentivized to verify the wire information through safe mechanisms. A phone call is industry standard but can be spoofed too.

Additionally, one of the bigger obstacles to the verification phone call is that it is a synchronized operation. The customer needs to talk to someone that knows the wire information at the time the customer is available. The customer may want to send a wire before or after work, and this means that the title company may not be open yet as it is outside of business hours, or the person is not available. There could be some issues related to time zones. The person who can do the verification may not be available. The verification may also be done incorrectly. For example, the person from the title company may speak too fast or not clearly, thus confusing the customer or not providing the full information. In some cases, the person from the title company may ask the customer for the wire information themselves. After the "verification" is done, the person from the title company may say something of the form "Yes, that matches our information". Except, this means that the customer did not actually verify the veracity of the information. They could verify fraudulent information with a spoofed phone call. Or it could be that someone else is calling you to verify the information.

When done properly and quickly, a phone verification should not take more than 5 minutes. But given the synchronicity of the call and having to talk to the right person, and the potential for phone tags, the actual verification can take 15 to 30 minutes total, often with multiple tries. It is time-consuming for the consumer but for the title company too, and it is not a rewarding operation, just an optional step that should be reviewed. For that reason, most people do not verify the wire information as it is too cumbersome. But to fight financial fraud, the opposite is needed; more verification of wire information.

The invention provides a fast way to verify the banking information for a wire and in a way that is very secure for both the consumer and the title company. Providing this verification increases the difficulty for fraudulent wire information to be used, especially if this information is shared on all key documents and emails from the beginning, while reducing the time spent verifying this banking information for the wire. Customers should call the title company for additional verification, but the goal is to reduce the barrier to entry so they can have a very secure and always available 3rd party verification that can add more confidence in the validity of the information.

Additional Issues

When providing verification through a 3rd party information, it may seem a good idea to not share the banking information through emails, signing, and title documentation but exclusively go through a more secure portal. On paper, this means you centralize the information and thus reduce the area of attack.

In reality, this has the main drawback that you do not provide redundancy anymore but a single point of failure. The customer may never receive the official email but instead receive a spoofed email pointing them to a different portal that would be fraudulent. Customers may not be able to tell the difference and may still send the funds to a fraudulent bank account.

If the portal is getting hacked, it could show some fraudulent information to the customer. Or worse, every single banking information and personal information for each customer could be hacked and/or leaked. Using HTTPS requests with AES 256/SSL/TLS will not provide much security if the information in the backend has been compromised. Even if the information is locally encrypted in the database, the encryption key is still available to the backend or client code, and thus nothing is really secure for some more advanced attacks. Pretty much all software companies have been hacked at this point. For the most secure experience, the backend implementation has to assume that it will eventually be compromised, and that very little information should be usable by attackers.

To increase security against financial fraud when sharing banking information, you need to provide redundancy of information, provide an encryption model that is not compromised in case of adversarial attacks, and the system needs to be easy to use by both the customer and the title company.

The initial step between the publisher and the reader is the most important, as it starts the handshake between the two parties. An attacker could spoof one or the other party and potentially compromise the communication at the initial stage. Furthermore, if the publisher's communication gets compromised and the reader is not careful enough, the communication can also be compromised at a later stage. A secure system is based on the premise that both parties initiate secure communication, and that the reader continues the verification and access of the information through a secure system. Note that, at any time, both publishers and readers themselves can be compromised through various adverse attacks.

There are examples of existing technology, but they address financial fraud in a more conventional way, by using a standard portal with simple encryption of the data in the backend programming. Security redundancies would make the work harder for thieves.

There remains a need in the art for a solution to at least one of the aforementioned problems to mitigate the drawbacks associated with security limitations and to better secure funding during wire transactions.

These and other objects, features, and advantages of the present invention will become more readily apparent from the attached drawings and the detailed description of the preferred embodiments, which follow.

SUMMARY OF THE INVENTION

Bearing in mind the problems and deficiencies of the prior art, it is therefore an object of the present invention to provide a system for wire verification which is secure and resistant to attack or fraud.

It is another object of the present invention to provide a system for wire verification which incorporates Zero Knowledge architecture to enhance security.

It is still another object of the present invention to provide a system for wire verification which incorporates generates a URL associated to a public key to enhance security.

It is yet another object of the present invention to provide a method for using the system for wire verification for secure transactions, and secure information sharing.

Still other objects and advantages of the invention will in part be obvious and will in part be apparent from the specification.

The above and other objects, which will be apparent to those skilled in the art, are achieved in the present invention which is directed to a wire delivery system for secure sharing of information. The wire delivery system includes a sharing party which requires sharing of the information, a receiving party for receiving the information and a verification system for allowing the receiving party to securely verify and access the information received from the sharing party. The verification system includes a plurality of layers of security for providing resilience to adversarial attacks wherein the plurality of layers of security excludes the information to be shared. The verification system generates a URL associated to a public key, the public key generated from data known by the receiving party and the sharing party, the data being transformed to generate an encryption key. The verification system is obfuscated to enhance security. The verification system may incorporate random data in the public key. The verification system may be split to enhance security. The verification system may track and output statistical information regarding use conditions. The verification system may be integrable with fraud prevention insurance organizations for enhanced security of transactions. The verification system may achieve heightened security for online transactions. The verification system may facilitate verification conducted by the receiving party by inputting known information to the verification system, incorporating known information utilizing 2nd factor authentication to the system and incorporating branding and information known to both the sharing party and receiving party but not by the verification system. The verification system may utilize a crawler to simulate behavior of the verification system. The verification system may carry additional payload of information sent by the sharing party for the receiving party to verify. The verification system may layer with 2nd factor authentication to enhance security. The verification system or information generated therein may be stored in a blockchain for enhanced security. The URL may be associated with a salt to further enforce security. The wire delivery system may implement Zero Knowledge architecture to enhance security of the sharing of the information.

Another aspect of the present invention is directed to a method of using the wire delivery system described in the paragraph above or in other aspects of the invention. The method includes executing a preliminary transaction wherein at least one datum is used in the preliminary transaction wherein at least one datum is known by the sharing party and the receiving party and wherein at least one datum is absent from the verification system. The method includes initiating a primary transaction and generating a URL associated to a public key. The method includes the delivery system requesting the primary transaction and the receiving party confirming accuracy of at least one datum. The method includes providing at least one additional layer of security and allowing the primary transaction to occur.

Another aspect of the present invention is directed to a method of using the wire delivery system wherein the method includes the sharing party registering the information and a payload on the verification system, the payload encrypted from the transformation of fields used in a compound key. The method includes the verification system returning a secure URL and verification code to the sharing party and the sharing party sharing the secure URL with the receiving party, the secure URL, and including the verification code and fields included in the compound key. The method includes the receiving party accessing the URL and entering the fields and the receiving party verifying the verification code and the information.

Another aspect of the present invention is directed to a wire delivery system for secure sharing of information. The wire delivery system includes a sharing party which requires sharing of the information, a receiving party for receiving the information and a verification system for allowing the receiving party to securely verify and access the information to be shared by the sharing party. The sharing party and the receiving party have previously initiated communication including data used for verification and wherein the receiving party verifies the information with the sharing party using the data. The verification system may generate a compound key and transform it to an encryption key (like by hashing it). A verification code may be generated from the transformed compound key and is human-readable.

Another aspect of the present invention is directed to a system of fraud prevention to share secure information through an ordinary key. The system includes a publisher for sharing information in a secure manner and a reader securely verifying data to access the information. The publisher registers the information on a prover platform having fields used to create a compound key. The prover returns a secure URL and a verification code for the publisher to share with the reader. The compound key includes fields wherein the reader connects to the secure URL, enters the fields shared by the publisher and verifies that the verification code and information matches. The reader may access an additional encrypted payload provided by the publisher which can be decrypted by the reader.

The system according to the present invention enables a receiving party to verify the information received from a sharing party using easy-to-use keys that are shared between them. These keys may include standard banking information, personal details, or any other relevant information. The Zero Knowledge architecture ensures that all data is fully encrypted, and only the sharing party or the receiving party can decrypt the stored information using the provided keys.

Another aspect of the present invention is a system of fraud prevention to share secure information through an ordinary key. The system includes a sharing party for sharing information in a secure manner and a receiving party securely accessing the information. The sharing party registers the information on a secure delivery system having fields used to create a security datum. The secure delivery system returns a secure URL and an optional verification code for the sharing party to share with the receiving party. The secure delivery system does not store the security datum or a transformation of the security datum. The receiving party connects to the secure URL, enters the datum shared or known by both the sharing and receiving parties. The receiving party may access an additional encrypted payload provided by the sharing party which the receiving party can decrypt using the security datum being generated from the shared datum. The receiving party may verify that the verification code and information match in the data. After verification, the role of the sharing and receiving parties could be swapped to allow for secure bidirectional sharing of information.

BRIEF DESCRIPTION OF DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
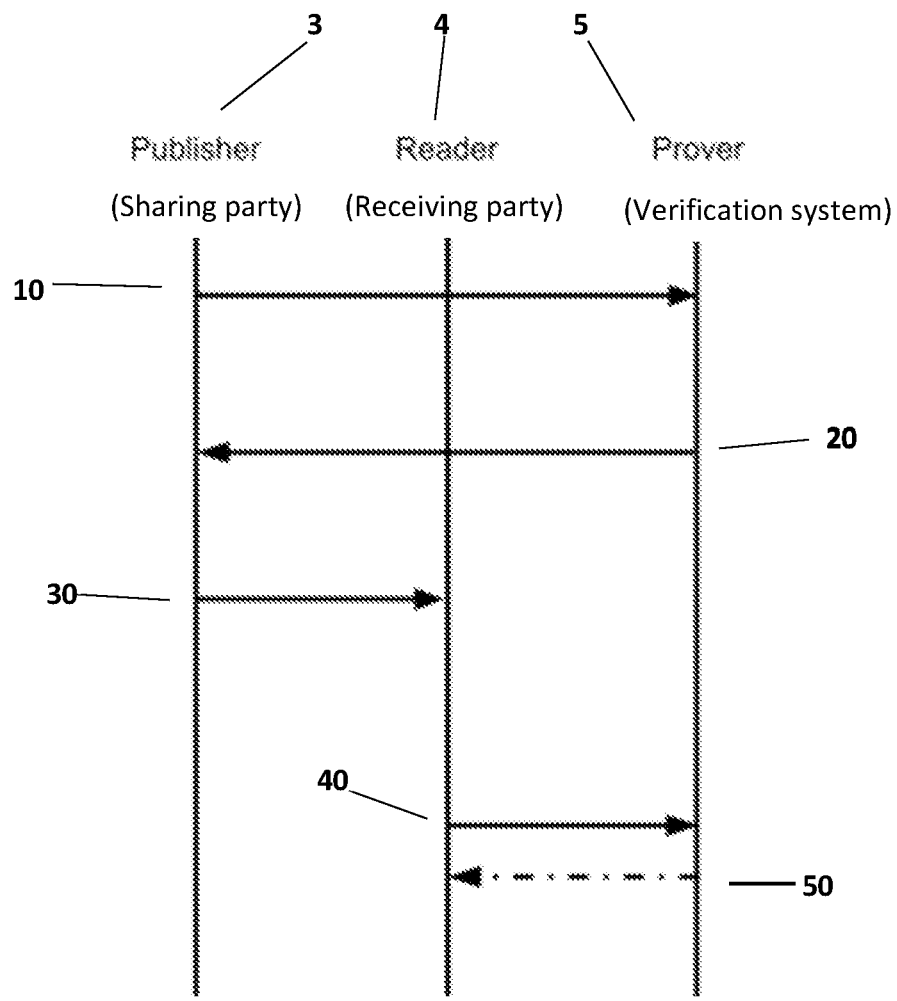
FIG. 1 is a diagram showing the use of the system for wire verification according to the present invention.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art however that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

The terms publisher and sharing party are used interchangeably to mean a party which requires sharing of information in a secure manner.

The terms reader and receiving party are used interchangeably to mean a party who wants to securely verify or access the information from the sharing party.

The terms prover and verification system are used interchangeably to mean a system that allows the receiving party to securely verify and access information shared by the sharing party.

In this application the following terms are defined:

Publisher: A sharing party which requires sharing of information in a secure manner. The party wants to make the verification of or access to the information very secure. Examples of a publisher are a bank, a title or insurance company, an investment or private equity fund, a lawyer office, a CPA, a vendor, or a company that transacts with secure information. As an example, the publisher may be a title company that needs to share their banking information so future homeowners can wire funds to close the sale of a real estate property. According to the present invention, the publisher is publishing secure information.

Reader: A receiving party who wants to securely verify or access the information from the publisher. One example of a reader is a home buyer wanting to ensure that the banking information received in the closing documents is the correct information. The reader verifies and accesses the secure information.

Prover: A verification system that allows the reader to securely verify and access information shared by the publisher.

Zero Knowledge architecture allows the ability to prove knowledge of information without knowing, thus revealing, what the information is.

Referring now to the drawings FIG. 1-4, and more particularly to FIG. 1, the diagram shows the use of the system for wire verification according to the present invention. The diagram shows a workflow of between the sharing party/publisher 3, the verification system/prover 5 and the receiving party/reader 4 where the publisher 3 registers secure information on the prover platform with fields used to create the compound key, plus optionally additional payload what will be encrypted 10. The verification system/prover 5 sends back a secure URL and verification code 20; which the publisher 3 shares with the reader 4 and the fields used to create the compound key 30. The reader 4 connects to the secure URL, enters the fields shared by the publisher 3 to create the compound key (banking information) and verifies that the verification code and information matches. The reader 4 may access 40 an additional encrypted payload provided by the publisher 3 that can be decrypted 50 by the reader 4.

In a transaction, both the publisher and the reader have previously initiated some communication, and the publisher provided some information (directly as-is, through a phone call, or SMS, or through an indirect way, such as a link to a web portal). The reader verifies the information with the prover using the information in the transaction. The system:
 a. Adds layers of verification,
 b. Keeps this verification as lean and simple as possible,
 c. Makes the verification very secure.

The system generates a compound key and its encryption key (for example, through hashing). A hash function is a function that can be used to map data of arbitrary size to fixed-size values. Some hash functions support variable length output. The system is based on a Zero Knowledge architecture, where the Prover has no direct knowledge and does not store the encryption key anywhere.

A compound key is defined by the Publisher and is known by the Reader, either by some intrinsic knowledge as in personal information or extrinsic knowledge provided or agreed upon by the Publisher.

The compound key is based on the available information known by both Publisher and Reader. As example, when verifying banking information to send a wire, the compound key could be based on the routing number and the account number, such as:
 a. ENCRYPTION KEY=<ROUTING NUMBER>_<ACCOUNT NUMBER>
  i. Where ROUTING NUMBER=123456789 and ACCOUNT NUMBER=333444555666
 This would generate the following compound key:
 b. COMPOUND KEY=123456789_333444555666
 c. With '_' being one potential separator between each field of the banking information. The separator is not part of the provided banking information fields.

Both Publisher and Reader would not need to write the compound key by hand, they would just type the Routing number and Account number when prompted, and the key would be auto generated by the Prover.

The compound key could be hashed. This is a destructive operation that loses the characteristics of the original key while still providing a deterministic result. Even if the hashed compound key is brute-force attacked, the attacker cannot easily reverse engineer the compound key to retrieve the initial banking information, such as routing and account numbers if used in generation of the compound key.
 a. Example with SHA2 Hash (length: 256, iterations: 600,000): COMPOUND KEY=123456789_333444555666
 b. Resultant hashed compound key: 8e784c41503ebd397371b2c8b91adbd2de6872071541e07d7c5b6a42484fda21

The hashed compound key is used as one of the elements for an encryption key.

The compound key is generated from information provided by both Publisher and Reader. The Prover does not need to know the details of the compound key. If the banking information has been leaked or compromised, it is through the Publisher or Reader usage or infrastructure, not as part of the Prover system.

Verification of Information is Conducted Through a URL.

The URL is generated and associated to a public key.

The Reader securely verifies information provided by the Publisher. When a Publisher decides to securely share information, an associated secure URL is generated. This secure URL would be unique and composed, for example, with a unique identifier that cannot be guessed, or easily brute forced, and that URL is then shared by the Publisher to the Reader.

The compound key can only apply to the corresponding secure URL through HTTPS requests. Without the unique and secure URL, an attacker would not be able to use the portal to brute-force the encryption key to figure out the original banking information.

The usage of the URL can also be limited based on time, location of the reader, number of accesses, or any other criteria.

This unique and secure URL provides multiple advantages. A publisher could customize the content of the URL, the URL provides additional security, and the URL avoids potential collisions when the same banking information is used multiple times in different contexts. Example of secure URL: www.safe-wire.com/en/a7d32de8 where "a7d32de8" being a unique identifier randomly generated.

A Verification code and an Encrypted Payload are utilized to leverage the Prover. Disclosed is how the Reader leverages the Prover to make sure that the information provided by the Publisher is legitimate.

The Prover would not be able to verify as-is that the Reader's information is identical to the Publisher's, as the Prover does not store the hashed compound key anywhere.

Instead, a verification code is used which enables the Reader to double-check the secure information.

The verification code is generated from the hashed compound key and is easily human-readable. Using a subset of the hash and even adding another layer of hashing (therefore significantly reducing reverse-engineering capability) would make it easier to understand.

As example, a verification code of the form AB12-CD34, as in eight (8) Base32 characters, provides 1 trillion combinations (32^8>1E12). This is enough to prevent a standard brute force approach from generating the same verification code but from a different compound key, and it virtually guarantees that two identical verification codes between the Publisher and Reader correspond to the same secure information and that the Reader has successfully verified the information.

Use of the encryption key (based on the hashed compound key) will symmetrically encrypt/decrypt some additional payload (for example, a JSON blob, some files, or some other information). In addition to using the secure information as part of the encryption key to generate the verification code, the Publisher may decide to add an additional payload that could encrypt through the same encryption key. This would allow the Reader to then decrypt and retrieve the additional payload as they can also generate the same encryption key (through the compound key) and decode the encrypted payload.

The encrypted payload is used by the Publisher to share additional information with the Reader (such as Bank address, or contact information, or beneficiary). Information to generate the encryption key (like the routing and account number) will not need to be added to the encrypted payload as it was known to do the decryption.

A random data set, known as "salt", is used as an additional input to a one-way function that hashes data, a password or a passphrase. The URL is generated with an associated salt to further enforce security.

The salt is added as part of the initial compound key (before the hashing).

The system will prevent an attacker from leveraging an already compromised encryption key (for example, through a brute force attack) and trying to reuse the same encryption key on another encrypted payload, with expectation that one of them will decrypt because the compound key may be the same.

The compound key is hashed so the attacker cannot discover the secure information to generate the compound key from the encryption key. Even if the compound key is the same, adding a salt will generate a different encryption key. The best an attacker can do is brute-force the other encrypted payload again and not be able to leverage the information from the first encrypted key.

An example of how the compound key would be salted:
  a. SALTED COMPOUND KEY=<SALT>_<ROUTING NUMBER>_<ACCOUNT NUMBER>
  b. Continuing the example above with SHA2 Hash (length: 256, iterations: 600,000): SALT=8abc9ff6
  c. SALTED COMPOUND KEY=8abc9ff6_123456789_333444555666
  d. HASHED SALTED ENCRYPTION KEY=306450216bff57280aa982e5f53dbe9c6b785dfaf96372b64b80117cb516bf91

The salt needs to be a reasonable size; 8 characters will suffice for most cases to make the compound key unique with the URL, thus ensuring the encryption key is unique, too, and cannot be reused on a second encrypted payload or verification code with the same banking information key even if the first one was brute-forced.

QR Code and Split Key

When the Reader opens the Prover portal, the Reader can then manually enter the banking information to generate the encryption key without having to be logged in. This manual process is psychologically important as it means the banking information is entered by the Reader and not known by the Prover. It also allows the Reader to change the information and see that the verification will fail, i.e., this is indeed a valid verification and not a fake screen, a phishing, or spoofing attempt.

In some circumstances, the Publisher may decide to still give a single easy-to-use secure URL to the reader where the Reader does not have to enter the banking information themselves (because it is not as easy to use, not user-friendly, and error-prone). It could be provided through a QR code, for example, in the closing, private memorandum of placement, or bank documents. However, the banking information has to be entered somehow as the Prover does not know them, and the Reader does not want to enter them.

Putting the banking information clearly in the URL is a major security concern. Anyone could read the banking information. For example: www.safe-wire.com/en/a7d32de8?routing=123456789&account=333444555666

A standard encryption/encoding would be much better at preventing most customers from figuring out the banking information, but a not-so-sophisticated attacker could figure out the compound key by reverse engineering the portal client code, therefore a higher level of security is provided.

To enable a Reader to access the secure information just with a simple link while preventing an attacker from guessing the banking information just through the URL, disclosed is a split of the key into two pieces. One portion of the key is as part of the URL, and another portion of the key is in the Prover. Both portions of the key is required to properly decode the banking information.

Splitting the key in the middle is not advised, as it would significantly reduce the strength of the key, and the attacker could easily brute force the second half of the key. Instead, a random key is generated (of the same size) and XOR it with the encoded key (exclusive OR, bit by bit), so the resulting two portions of the key is completely random.

Assuming that the safe URL with encoded banking information looks like: www.safe-wire.com/en/a7d32de8?k=ZjA9MTIzNDU2Nzg5JmYxPTMzMzQONDU1NTY2Ng==
  a. With the parameter k of the request being a base64 encoding of the banking information f0=123456789&f1=333444555666, with f0 mapped to routing number and f1 mapped to account number.
  b. With k being a string, which is 40 Base64 characters in length, the system would generate a random 40 Base64 characters long obfuscated string:
    i. Obfuscated Key 1=g8qkf9ectsCrzp8xopw8491mnp4z
    ii. Base 64 Obfuscated Key 1=Zzhxa2Y5ZWNOcONyenA4eG9wdzg0OTFtbnA0eg==
  c. The second obfuscated key is generated by XOR-ing the initial parameter k with the obfuscated key 1.
    i. Obfuscated Key 2=<contains unprintable special characters>
    ii. In Hexadecimal=01084c5a540a515642447b4b5c1609455c43440c000d04585b46024c
    iii. Base 64 Obfuscated Key2=AQhMWIQKUVZCRHtLXBYJRVxDRAwADQRYWOYCTA== d. Both obfuscated Key 1 and Key 2 will look like random keys. Only when they are both composed through an XOR operation will the system be able to get back to ZjA9MTIzNDU2Nzg5JmYxPTMzMzQONDU1NTY2Ng==, which can then be Base64 decoded to f0=123456789&f1=333444555666.

Obfuscated Key 1 would be used as part of the secure URL shared with the Publisher and the Reader. Obfuscated Key 2 would be stored in the Prover database and associated with the URL (the a7d32de8 key).

a. URL shared by the publisher (directly or through a generated QR code):
b. www.safe-wire.com/en/a7d32de8?sk=Zzhxa2Y5ZWNOcONyenA4eG9wdzg0OTFtbnA0eg==

Without a brute-force attack from scratch, an attacker would not be able to figure out the actual banking information solely based on the URL. Furthermore, by disabling and/or removing the 2nd key at the prover level, the system can directly invalidate the proper decoding. (i.e., the information is lost, so this gives a centralized control point where the fully secured URL could be rendered completely useless at any time with no useful information to extract from).

Additional 2FA for Readers

Despite having a secure URL with the encryption key generated from the Reader entered fields, or automatically through a split key, and with a verification code, there exists a conduit for an attacker to snoop the client side and get access to the encrypted payload, or in clear in case of automatic through a split key. Even with the encrypted payload, there exists an opportunity for the attacker to brute-force the encrypted payload to retrieve the secured information.

For an additional layer of security, the Publisher could enable 2FA (2nd Factor Authentication) for the Reader. This 2FA could be based on a One Time Password (OTP) or other verification methods (e.g., a verification link to click, through a phone call, SMS, email, authentication app, or other mechanism). Only when the Reader passes the 2FA validation, the Prover client code is able to retrieve the encrypted payload from the Prover backend.

The Publisher will generate a URL and could select a list of 2FA options for Readers when creating the secure information to limit additional attacks even if the URL was compromised. The prover could also ask the Publisher (synchronously or asynchronously) if they want to explicitly share the information through the URL with each access from the Readers. Determination by the Publisher could be facilitated by providing the authentication methods used by the Reader. Once approved, the Reader would receive a notification (email, phone call or SMS, etc.) to access the URL again with the same or different authentication method to access the shared information.

Store the Hashed Key on the Blockchain for Further Proof

Increasing the security further, leveraging existing decentralized cryptocurrency solutions based on blockchains could be implemented.

The encrypted payload would not be stored as-is on-chain on the blockchain as an attacker could access it and brute-force the decryption offline. Additionally, the size of the encrypted payload (which could contain some files of a significant size) could be cost prohibitive, slow, and add maintenance complexity.

The encryption key would not be stored as-is on the blockchain, as this would allow an attacker to use this key on some available encrypted payload (accessed through some other means) in the hope of finding a matching key/payload combination.

The size of the hashed encryption key is very compatible with storing on-chain on the blockchain. The verification of this key could be a small storage footprint, fast, and with simple access. A solution is to take the existing encryption key that is used to encrypt/decrypt the payload, add another unique salt to it (a Blockchain salt), and further hash it to generate a Blockchain Verification Code. The Blockchain Verification Code is stored on-chain in a Bitcoin, Ethereum, or any other cryptocurrency blockchain. The Prover backend will store the Blockchain salt and Blockchain address along with the normal encryption salt and the encrypted payload.

When the Reader accesses the secure URL, and they retrieve the encrypted payload, and the proper compound key fields are entered, the Prover client code will also receive the Blockchain salt and address from the Prover backend that was stored along with the rest of the encrypted information. The Prover client can then apply the same operation by applying the Blockchain salt, hashing to the final Blockchain Verification Code, and verifying that it matches the content at the expected Blockchain address. This information can then be displayed to the Reader as further proof, along with a link to the Blockchain information on a third-party Blockchain website.

Verification—Crawler

There exists another vector of attack that the system will protect against. An attacker could try to access the Prover code base, and despite not being able to reverse-engineer the encrypted payloads, the attacker may decide to alter the behavior of the Prover so a Reader could have a positive verification of fraudulent information. This would mean that the attacker not only can change the behavior of the Prover but also that the attacker can spoof the Prover and make believe the Reader that the fraudulent information has to be verified through the Prover. It is a very high bar to achieve that, and one could argue that if that were the case, the attacker should just spoof the Publisher to the Reader and convince them to bypass the Prover altogether. It would then be a much lower bar for the attacker than attacking both the Reader and the Prover.

The system is able to detect alterations to the behavior of the Prover to protect the interests of the Publishers and Readers at any time. The system will have a fully external system (a Crawler) that will simulate the behavior of a Reader.

The crawler can be called from any place in the world and would not look any different than a valid Reader.

This Crawler would do multiple things:
a. Access all the JS, HTML, CSS, PNG, JPG, and any other downloaded files and compare them to the reference implementation of the Prover client. If an attacker changes any of these files, this could be detected right away, and alerts could be sent to the maintainer of the Prover through various means that the attacker would not be aware of.
b. Access a specific set of secure URLs with known key fields, populate them, and verify that the system gets the properly encrypted payload and that the decryption and Verification Code have the expected values. This would show that the basic backend behavior of the Prover is respected.
c. Each newly created secure URL could be given access to the crawler through a secure means. The crawler would not be able to know the encryption key. However, it could enter some pre-defined encryption fields and try to do the verification. This is guaranteed to fail. However, the content of the encrypted payload and the verification code should stay stable over time.

These various checks would add another layer of security and would give some level of assurance that the client and backend behaviors of the Prover have not been modified and the Readers should still have the expected quality of service and security.

List of Known Information that can be Used to Create the Public Key

Examples of the kind of information that the Publisher can use as compound fields:

a. Banking information such as Routing and Account number for wires and ACH, SWIFT, IBAN, Canada Bank account, UK Bank account, German BLZ, Australian BSB, Mexican CLABE, etc.

b. Company Information such as tax information (EIN, SIRET, etc.), State File number, etc.

c. Investment Information such as a property address (partial like a street number and/or street name, city, state, ZIP code, or full and sanitized so it is consistent), number of units, floors, bedroom/bathroom information, etc.

d. Private Information such as
 i. Personal or company e-mail
 ii. First and/or last name and/or a combination with a middle name or initial
 iii. Birth date (partial or full)
 iv. Tax identifier (SSN, ITIN, EIN, etc.), full or limited to N digits
 v. Phone number
 vi. Employee ID, full or limited to N digits
 vii. Address (legal, shipping, billing). Partial like a street number and/or street name, city, state, ZIP code, or full and sanitized through services accepted by post offices (so it is consistent).
 viii. Pre-shared PIN or password. Like pin used by debit/credit card, sent by mail or email. Single temporary or multi-usage passwords.
 ix. Information about self, parents, children, and all ascendants and descendants' relatives. Close or distant relatives.
 x. Driving license, ID, or passport number, and/or issue date, or expiration date, or any other official documents.
 xi. Account number(s) or unique information that cannot be easily guessed for a given company,
 xii. Information about existing or closed loans, mortgages, credit card information (number, expiration, name, CVV, or objects of the loan, like car brand and model or year of manufacturing, etc.)
 xiii. Any answer to existing security questions e. Other categories include any other information that both Publisher and Reader know but is not necessarily public knowledge. Especially information that the Reader shared with the Publisher when they initiated contact for a transaction.

The information must be known by both the Publisher and Reader, cannot be guessed by anyone else, and has to be stable.

Encrypted Files

All of the same logic related to the encrypted payload applies to support for files.

The system provides a way to encrypt multiple files that can be downloaded from the same secure URL. These files are not stored unencrypted in the Prover back-end but encrypted by the same key as the encrypted payload that is not known by the back end. As such, an attacker of the Prover back-end would not be able to gather any useful information.

Gather Statistics

The Prover verifies and provides access to secure information as part of a Zero Knowledge architecture, and due to its centralized nature, it can also provide additional information to the users of the Prover platform. For example:

a. Publishers could monitor the usage of the secure information they are sharing, how often they are accessed, and when. For privacy reasons, they could see the unique users in a privacy-aware way protecting the Readers based on hashed IPs and overall geo-location, for example. They could check historical data and if the usage pattern fits with the intent of the wire (long or short-term bank information being shared).

b. Readers use the Prover to make sure the wiring information is legitimate, and the system will provide all the necessary tools to help build this confidence. For example, the Reader could see when the company has been established, and the secure URL has been set up. The longer, the better. They can also see how many times the URL has been verified by different users. A wire information that has been set up in the past few days and barely used is probably more at risk for fraud than a wire information that was set up a year ago and has been used dozens of times every week from a reputable company.

c. As a service, the unique URL can be changed to a vanity URL to make it more convenient and more easily recognizable by both Publishers and Readers. It is understood that leveraging this may reduce the security of the URL in some cases. Here are some examples with various trade-offs:
 i. Option A: www.safe-wire.com/en/<name>-a7d32de8
  1. Where <name> represents the company, account, property, syndication, or deal name. This option A is as secure as before as the unique identifier a7d32de8 still cannot be guessed.
 ii. Option B: www.safe-wire.com/en/<name>
  2. Where <name> represents the company, account, property, syndication, or deal name. Option B is much less secure than Option A. An attacker could guess it, and this opens the door to brute force attack. However, this could be a short URL used to present the company itself (with no secure information to get access to).

A Publisher may decide to lock the <name> in the Prover to further prevent spoofing. The Publisher could add a list of keywords in the Prover platform to prevent the creation of corresponding vanity URLs. For example, the Cali Bank could decide to lock the terms "cali" and "bank" together or a combination of them, thus preventing anyone from spoofing the Cali Bank through a vanity URL. For example, "calibank", "cali-bank", "<anytext>calibank<anytext>," "bankcali", etc. would be rejected by the Prover as part of the vanity URL creation unless it is initiated by the Cali Bank itself. However, the Prover platform must have full discretion in terms of allowing specific keywords. Some keywords like "Bank," "Wire," "Safe," "LLC," etc. alone would not be good candidates to be locked by a Publisher as it would prevent other Publishers with similar needs from leveraging their own vanity URLs, or some terms could even be used as a phishing or spoofing vector.

Customization of Secure URL Page

To further build trust in the information provided by the Prover platform to the Reader, the Publisher should be able to customize the page that is displayed under the secure URL. Branding could be provided, such as color theme, logo, and additional information that could be accessible even without the secure compound key. The branding would be shared between multiple secure URLs of the same publisher.

Company Information

As part of the branding, the concept of a company is introduced. The company would represent a collection of Publisher accounts with a common set of secure URLs being shared. This would enable the company to use the Prover at scale.

Mechanisms would be established to ensure that an attacker cannot take over a Publisher and create fraudulent banking information. A quorum model can be defined to significantly reduce the chance of these attacks happening or for a company to lose access to their own accounts.

Verification and display checkmarks to make the reader more comfortable with the verified information.

To further increase the Reader trusting the information by the Prover and the Publisher, the Prover could display information that pertains to the steps used by the Prover to verify the authenticity of the Publisher, such as:
  a. Authenticity of the Publisher:
    i. The Prover platform team physically met the Publisher.
    ii. The Prover platform team met the Publisher through a Video Conference or had a phone call to verify the identity.
    iii. The Prover platform team verified the LLC organization paper, EIN, and State information.
    iv. The Publisher got verified by a 3rd party website (like ID.me and other similar websites).
    v. The Prover platform team received and verified a copy or scan of the Passport, Driving License, Personal ID, or any other Identification document used in the industry. Notarization, legalization, apostille, bank medallions, etc. may also be requested.
  b. Authenticity of the Bank Account:
    i. The Prover platform received a void check matching the banking information,
    ii. The Prover platform was able to independently verify the bank account.
    iii. The Publisher sent some funds to the Prover platform in escrow as a guarantee. This would be a good deterrent against fraud, especially if the sum is significant. The money could be sent with a check/ACH/wire with the same banking information or through a Blockchain transaction with the escrow account owned by the Prover platform.
    iv. The Prover platform team received information/insurance proving the authenticity of the Publisher and bank information through a 3rd party company (like fraud prevention, insurance, a cybersecurity company, etc.)

The Prover platform could display the various mechanisms used to verify the authenticity of the Publisher and/or the Bank Account. This will offer more assurance for the Reader of the validity of the verified information, especially if more proofs of authenticity are shared.

As an acceptance for the creation of banking information (the initial N bank information, or even for every single one) to be shared between a Publisher and the Readers, the Prover could define additional and specific requirements to meet in terms of the authenticity of the publisher and the bank account.

Templates

Publishers are expected to re-use the same combination of the secure URLs multiple times. The secure URLs could be based on the same banking information, company information, and logo.

A Prover platform could provide a mechanism for the Publisher to define and re-use pre-filled templates and not be forced to use the pre-selected templates. Using templates allows a company to guarantee the same quality bar with minimum employee training, even when used by multiple employees.

The Prover platform could provide a way for a Publisher to define a compound key for the secure URL based on the compound fields as described (phone number, birth date, social security number, etc.). As the Publisher selects the fields of their interests, (e.g., birth date, zip code) the Prover platform could indicate to the Publisher the strength of the compound key against brute force attacks.
  a. Using birth dates as an example, commonly composed in a format MM/DD/YYYY (using the standard US format but could be DD/MM/YYYY or YYYY/MM/DD). It has 8 digits, thus could be considered a 1 combination in 100 million, but in reality, it is much lower. DD can only be between 01 and 31, MM can only be between 01 and 12, and the most common dates would be between 1900 and the current year+30 years (end year for a 30-year loan, for example). Not accounting for months that only have 28/29/30 days and using 2060 as the maximum year, there are fewer than 60,000 birth date combinations which makes it a weak key by itself. (31*12*160=59,520).
  b. There are fewer than 42,000 ZIP codes in the United States, and they can be guessed in some circumstances. This would be a weak key by itself.
  c. Combining the two fields, almost 2.5 billion combinations exist, which is a stronger key.
  d. Email can have a wide range of values, especially if the '+<suffix>' is added and '.' to randomize the email itself. This can increase flexibility for the Publisher and the Reader.
  e. Despite using 9 digits, the Social Security numbers before June 2011 were not randomized, so an attacker could brute force them more easily. This would make a weak-strength key. Using only the last 4 digits of the social security number would make it a very weak key, too.
  f. The street name and number for the Reader could be a weaker key as it could be found based on information found on the Internet, but a street address for a future house/investment property would be much stronger as it could not be as easily guessed.

The more fields added, the stronger the compound key is, and therefore by showing the overall strength of the compound key to the Publishers, the Publisher could make wise choices in terms of the compound key for the Reader to access the secure data from.

To strengthen the key further against brute-force attacks, the system could increase the complexity of the hashing method to slow down attacks. This method has an impact on the usability for the Publisher (once) and especially the Readers though (each Reader), as the encryption/decryption process would be N times slower (10 times slower if the system iterates from 600,000 iterations to 6,000,000 iterations, for example) so this will not enable a massive scale against brute-force attacks. Some algorithms could be employed to defeat brute-force attacks leveraging GPU or ASIC.

The Publisher could duplicate an existing secure URL by simply providing the correct compound key in order to decrypt the encrypted payload data and recreate a new secure URL with the same compound key or even a new one while keeping the same payload or modifying it.

The Publisher could duplicate an existing secure URL (or one of its predefined templates), and create several secure URLs, one for each Reader, by just listing the personal information for each Reader, either through a web portal, a CSV file mapping each portion of the compound key, etc. And if the email or phone was provided, the Reader could then directly receive the information about the secure URL by email or phone, optionally cc'ing/bcc'ing the Publisher.

Redundancy for Additional Security

To further increase security, the system could have the client talk to two different backends instead of a single one. The backends would be in two completely different environments and potentially even two different implementations. The system would not be required to reproduce all the features there, only the mapping between the secure URL and an additional key. The SALT and the encrypted payload could be split between the two servers, for example, with a similar random XOR pattern discussed earlier. This means that to brute force the encrypted payload through the backend, the attacker would have to attack both backends.

To further harden the prover platform, the random XOR pattern could be regenerated regularly, and the encrypted payload could be updated accordingly. Thus, the attacker would need to have access to both backends simultaneously to be able to reconstitute the encrypted payload to be brute force.

In one embodiment of the invention, a subscription may be offered by the prover. The prover platform may offer a free and premium model with subscriptions based on the features used by the publisher and/or the reader.

Some Fraud Prevention Insurance companies could leverage the prover platform to reduce the potential for fraud, which in return will reduce their fees. As an example, insurance companies could force the publisher to use the prover platform. On the reader's side, the prover platform could connect with the Fraud Prevention insurance company to validate that the Reader, indeed, verified the secure banking information. This could be done, for example, through a specific Access Code/OTP shared by the Fraud Prevention Insurance Company to the Reader that would be entered by the reader in the prover UI, which in return would be sent to their backends for verification. This could be generalized with any other mechanism that allows verifying the identity of the Reader to the Fraud Prevention insurance company (letter, phone call, SMS, email, etc.).

One embodiment of the present invention, again referencing FIG. 1, includes a sharing party 3 and a receiving party 4 using a verification system 5, both the sharing party and the receiving party have previously initiated some communication where and the sharing party provided some information (directly as-is, through a phone call, or SMS, or through an indirect way, such as a link to a web portal). The receiving party verifies the information with the verification system before acting on it. The system will:

a. Add another layer of verification,
b. Keep this verification as lean and simple as possible,
c. Make the verification very secure.

The system generates a compound key and its encryption key (for example through hashing). The verification system is based on a Zero Knowledge architecture, and has no direct knowledge and does not store the encryption key anywhere.

The compound key is defined by the sharing party and will have to be known by the receiving party, either by some intrinsic knowledge (for example, personal information) or extrinsic knowledge (provided or agreed upon by the sharing party).

The compound key is based on the available information known by both sharing party and receiving party. As example, when verifying banking information to send a wire, the compound key could be based on the routing number and the account number, such as:

ENCRYPTION KEY=<ROUTING NUMBER>_<ACCOUNT NUMBER>
For example:
ROUTING NUMBER=123456789
ACCOUNT NUMBER=333444555666
would generate the following compound key:
COMPOUND KEY=123456789_333444555666
With '_' being one potential separator between each field of the banking information. The separator is not part of the provided banking information fields.

Both sharing party and receiving party would not need to write the compound key by hand, they would just type the Routing number and Account number when prompted, and the key would be auto generated by the verification system.

The compound key could be hashed. This is a destructive operation that loses the characteristics of the original key while still providing a deterministic result. Even if the hashed compound key is brute-force attacked, the attacker cannot easily reverse engineer the compound key to retrieve the initial banking information, such as routing and account numbers if used in generation of the compound key.

a. Example with SHA2 Hash (length: 256, iterations: 600,000): COMPOUND KEY=123456789_333444555666
b. Resultant hashed compound key: 8e784c41503ebd397371b2c8b91adbd2de6872071541e07d7c5b6a42484fda21

The hashed compound key is used as one of the elements for an encryption key.

The compound key is generated from information provided by both sharing party and receiving party. The verification system does not need to know the details of the compound key. If the banking information has been leaked or compromised, it is through the sharing party or receiving party usage or infrastructure, not as part of the verification system.

Verification of Information is Conducted Through a URL.

The URL is generated and associated to a public key.

The receiving party securely verifies information provided by the sharing party. When a sharing party decides to securely share information, an associated secure URL is generated. This secure URL would be unique and composed, for example, with a unique identifier that cannot be guessed, or easily brute forced, and that URL is then shared by the sharing party to the receiving party.

The compound key can only apply to the corresponding secure URL through HTTPS requests. Without the unique and secure URL, an attacker would not be able to use the portal to brute-force the encryption key to figure out the original banking information.

The usage of the URL can also be limited based on time, location of the receiving party, number of accesses, or any other criteria.

This unique and secure URL provides multiple advantages. A sharing party could customize the content of the URL, the URL provides additional security, and the URL avoids potential collisions when the same banking information is used multiple times in different contexts. Example of secure URL: www.safe-wire.com/en/a7d32de8 where "a7d32de8" being a unique identifier randomly generated.

A Verification code and an Encrypted Payload are utilized to leverage the verification system. Disclosed is how the receiving party leverages the verification system to make sure that the information provided by the sharing party is legitimate.

The verification system would not be able to verify as-is that the receiving party's information is identical to the sharing party's information, as the verification system does not store the hashed compound key anywhere. Instead, a verification code is used which enables the receiving party to double-check the secure information.

The verification code is generated from the hashed compound key and is easily human-readable. Using a subset of the hash and even adding another layer of hashing (therefore significantly reducing reverse-engineering capability) would make it easier to understand.

As example, a verification code of the form AB12-CD34, as in eight (8) Base32 characters, provides 1 trillion combinations (32^8>1E12). This is enough to prevent a standard brute force approach from generating the same verification code but from a different compound key, and it virtually guarantees that two identical verification codes between the sharing party and receiving party correspond to the same secure information and that the receiving party has successfully verified the information.

Use of the encryption key (based on the hashed compound key) will symmetrically encrypt/decrypt some additional payload (for example, a JSON blob, some files, or some other information). In addition to using the secure information as part of the encryption key to generate the verification code, the sharing party may decide to add an additional payload that could encrypt through the same encryption key. This would allow the receiving party to then decrypt and retrieve the additional payload as they can also generate the same encryption key (through the compound key) and decode the encrypted payload.

The encrypted payload is used by the sharing party to share additional information with the receiving party (such as Bank address, or contact information, or beneficiary). Information to generate the encryption key (like the routing and account number) will not need to be added to the encrypted payload as it was known to do the decryption.

A random data set, known as "salt", is used as an additional input to a one-way function that hashes data, a password or a passphrase. The URL is generated with an associated salt to further enforce security.

The salt is added as part of the initial compound key (before the hashing).

The system prevents an attacker from leveraging an already compromised encryption key (for example, through a brute force attack) and trying to reuse the same encryption key on another encrypted payload, with expectation that one of them will decrypt because the compound key may be the same.

The compound key is hashed so the attacker cannot discover the secure information to generate the compound key from the encryption key. Even if the compound key is the same, adding a salt will generate a different encryption key. The best an attacker can do is brute-force the other encrypted payload again and not be able to leverage the information from the first encrypted key.

An example of how the compound key would be salted:
a. SALTED COMPOUND KEY=<SALT>_<ROUTING NUMBER>_<ACCOUNT NUMBER>
b. Continuing the example above with SHA2 Hash (length: 256, iterations: 600,000): SALT=8abc9ff6
c. SALTED COMPOUND KEY=8abc9ff6_123456789_333444555666
d. HASHED SALTED ENCRYPTION KEY= 306450216bff57280aa982e5f53dbe9c6b785dfaf96372b64b80117cb516bf91

The salt needs to be a reasonable size; 8 characters will suffice for most cases to make the compound key unique with the URL, thus ensuring the encryption key is unique, too, and cannot be reused on a second encrypted payload or verification code with the same banking information key even if the first one was brute-forced.

QR Code and Split Key

When the receiving party opens the verification system portal, the receiving party can then manually enter the banking information to generate the encryption key without having to be logged in. This manual process is psychologically important as it means the banking information is entered by the receiving party and not known by the verification system. It also allows the receiving party to change the information and see that the verification will fail, i.e., this is indeed a valid verification and not a fake screen, a phishing, or spoofing attempt.

In some circumstances, the sharing party may decide to still give a single easy-to-use secure URL to the receiving party where the receiving party does not have to enter the banking information themselves (because it is not as easy to use, not user-friendly, and error-prone). It could be provided through a QR code, for example, in the closing, private memorandum of placement, or bank documents. However, the banking information has to be entered somehow as the verification system does not know them, and the receiving party does not want to enter them.

Putting the banking information clearly in the URL is a major security concern. Anyone could read the banking information. For example: www.safe-wire.com/en/a7d32de8?routing=123456789&account=333444555666

A standard encryption/encoding would be much better at preventing most customers from figuring out the banking information, but a not-so-sophisticated attacker could figure out the compound key by reverse engineering the portal client code, therefore a higher level of security is provided.

To enable a receiving party to access the secure information just with a simple link while preventing an attacker from guessing the banking information just through the URL, disclosed is a split of the key into two pieces. One portion of the key is as part of the URL, and another portion of the key is in the verification system. Both portions of the key are required to properly decode the banking information.

Splitting the key in the middle is not advised, as it would significantly reduce the strength of the key, and the attacker could easily brute force the second half of the key. Instead, a random key is generated (of the same size) and XOR it with the encoded key (exclusive OR, bit by bit), so the resulting two portions of the key are completely random.

Assuming that the safe URL with encoded banking information looks like: www.safe-wire.com/en/a7d32de8?k=ZjA9MTIzNDU2Nzg5JmYxPTMzMzQONDU1NTY2Ng==
  a. With the parameter k of the request being a base64 encoding of the banking information f0=123456789&f1=333444555666, with f0 mapped to routing number and f1 mapped to account number.

b. With k being a 40 Base64 characters long string, the system would generate a random 40 Base64 characters long obfuscated string:
   iii. Obfuscated Key 1=g8qkf9ectsCrzp8xopw8491mnp4z
   iv. Base 64 Obfuscated Key 1=Zzhxa2Y5ZWNOcONyenA4eG9wdzg0OTFtbnA0eg==
c. The second obfuscated key is generated by XOR-ing the initial parameter k with the obfuscated key 1.
   iv. Obfuscated Key 2=<contains unprintable special characters>
   v. In Hexadecimal=01084c5a540a515642447b4b5c1609455c43440c000d04585b46024c
   vi. Base 64 Obfuscated Key2= AQhMWIQKUVZCRHtLXBYJRVxDRAwADQRYWOYCTA==
d. Both obfuscated Key 1 and Key 2 will look like random keys. Only when they are both composed through an XOR operation will the system be able to get back to ZjA9MTIzNDU2Nzg5JmYxPTMzMzQONDU1NTY2Ng==, which can then be Base64 decoded to f0=123456789&f1=333444555666.

Obfuscated Key 1 would be used as part of the secure URL shared with the sharing party and the receiving party. Obfuscated Key 2 would be stored in the verification system database and associated with the URL (the a7d32de8 key).
a. URL shared by the sharing party (directly or through a generated QR code):
b. www.safe-wire.com/en/a7d32de8?sk=Zzhxa2Y5ZWNOcONyenA4eG9wdzg0OTFtbnA0eg==

Without a brute-force attack from scratch, an attacker would not be able to figure out the actual banking information solely based on the URL. Furthermore, by disabling and/or removing the 2nd key at the verification system level, the system can directly invalidate the proper decoding. (i.e., the information is lost, so this gives a centralized control point where the fully secured URL could be rendered completely useless at any time with no useful information to extract from).

Additional 2FA for Receiving Party

Despite having a secure URL with the encryption key generated from the receiving party entered fields, or automatically through a split key, and with a verification code, there exists a conduit for an attacker to snoop the client side and get access to the encrypted payload, or in clear in case of automatic through a split key. Even with the encrypted payload, there exists an opportunity for the attacker to brute-force the encrypted payload to retrieve the secured information.

For an additional layer of security, the sharing party may enable 2FA (2nd Factor Authentication) for the receiving party. This 2FA could be based on a One Time Password (OTP) or other verification methods (e.g., a verification link to click, through a phone call, SMS, email, authentication app, or other mechanism). Only when the receiving party passes the 2FA validation, the verification system client code is able to retrieve the encrypted payload from the verification system backend.

The sharing party will generate a URL and could select a list of 2FA options for the receiving party when creating the secure information to limit additional attacks even if the URL was compromised. The verification system could also ask the sharing party (synchronously or asynchronously) if they want to explicitly share the information through the URL with each access from the verifying party. Determination by the sharing party could be facilitated by providing the authentication methods used by the verifying party. Once approved, the verifying party would receive a notification (email, phone call or SMS, etc.) to access the URL again with the same or different authentication method to access the shared information.

Store the Hashed Key on the Blockchain for Further Proof

Increasing the security further, leveraging existing decentralized cryptocurrency solutions based on blockchains could be implemented.

The encrypted payload would not be stored as-is on-chain on the blockchain as an attacker could access it and brute-force the decryption offline. Additionally, the size of the encrypted payload (which could contain some files of a significant size) could be cost prohibitive, slow, and add maintenance complexity.

The encryption key would not be stored as-is on the blockchain, as this would allow an attacker to use this key on some available encrypted payload (accessed through some other means) in the hope of finding a matching key/payload combination.

The size of the hashed encryption key is very compatible with storing on-chain on the blockchain. The verification of this key could be a small storage footprint, fast, and with simple access. A solution is to take the existing encryption key that is used to encrypt/decrypt the payload, add another unique salt to it (a Blockchain salt), and further hash it to generate a Blockchain Verification Code. The Blockchain Verification Code is stored on-chain in a Bitcoin, Ethereum, or any other cryptocurrency blockchain. The verification system backend will store the Blockchain salt and Blockchain address along with the normal encryption salt and the encrypted payload.

When the receiving party accesses the secure URL, and they retrieve the encrypted payload, and the proper compound key fields are entered, the verification system client code will also receive the Blockchain salt and address from the verification system backend that was stored along with the rest of the encrypted information. The verification system client can then apply the same operation by applying the Blockchain salt, hashing to the final Blockchain Verification Code, and verifying that it matches the content at the expected Blockchain address. This information can then be displayed to the receiving party as further proof, along with a link to the Blockchain information on a third-party Blockchain website.

Verification—Crawler

There exists another vector of attack that the system will protect against. An attacker could try to access the verification system code base, and despite not being able to reverse-engineer the encrypted payloads, the attacker may decide to alter the behavior of the verification system so a receiving party could have a positive verification of fraudulent information. This would mean that the attacker not only can change the behavior of the verification system but also that the attacker can spoof the verification system and make believe the receiving party that the fraudulent information has to be verified through the verification system. It is a very high bar to achieve that, and one could argue that if that were the case, the attacker should just spoof the sharing party to the receiving party and convince them to bypass the verification system altogether. It would then be a much lower bar for the attacker than attacking both the receiving party and the verification system.

The system is able to detect alterations to the behavior of the verification system to protect the interests of the sharing party and receiving party at any time. The system will have a fully external system (a Crawler) that will simulate the behavior of a receiving party.

The crawler can be called from any place in the world and would not look any different than a valid receiving party.

This Crawler would do multiple things:
a. Access all the JS, HTML, CSS, PNG, JPG, and any other downloaded files and compare them to the reference implementation of the verification system client. If an attacker changes any of these files, this could be detected right away, and alerts could be sent to the maintainer of the verification system through various means that the attacker would not be aware of.
b. Access a specific set of secure URLs with known key fields, populate them, and verify that the system gets the properly encrypted payload and that the decryption and Verification Code have the expected values. This would show that the basic backend behavior of the verification system is respected.
c. Each newly created secure URL could be given access to the crawler through a secure means. The crawler would not be able to know the encryption key. However, it could enter some pre-defined encryption fields and try to do the verification. This is guaranteed to fail. However, the content of the encrypted payload and the verification code should stay stable over time.

These various checks would add another layer of security and would give some level of assurance that the client and backend behaviors of the verification system have not been modified and the receiving party should still have the expected quality of service and security.

List of Known Information that can be Used to Create the Public Key

Examples of the kind of information that the sharing party can use as compound fields:
a. Banking information such as Routing and Account number for wires and ACH, SWIFT, IBAN, Canada Bank account, UK Bank account, German BLZ, Australian BSB, Mexican CLABE, etc.
b. Company Information such as tax information (EIN, SIRET, etc.), State File number, etc.
c. Investment Information such as a property address (partial like a street number and/or street name, city, state, ZIP code, or full and sanitized so it is consistent), number of units, floors, bedroom/bathroom information, etc.
d. Private Information such as
  i. Personal or company e-mail
  ii. First and/or last name and/or a combination with a middle name or initial
  iii. Birth date (partial or full)
  iv. Tax identifier (SSN, ITIN, EIN, etc.), full or limited to N digits
  v. Phone number
  vi. Employee ID, full or limited to N digits
  vii. Address (legal, shipping, billing). Partial like a street number and/or street name, city, state, ZIP code, or full and sanitized through services accepted by post offices (so it is consistent).
  viii. Pre-shared PIN or password. Like pin used by debit/credit card, sent by mail or email. Single temporary or multi-usage passwords.
  ix. Information about self, parents, children, and all ascendants and descendants relatives. Close or distant relatives.
  x. Driving license, ID, or passport number, and/or issue date, or expiration date, or any other official documents.
  xi. Account number(s) or unique information that cannot be easily guessed for a given company,
  xii. Information about existing or closed loans, mortgages, credit card information (number, expiration, name, CVV, or objects of the loan, like car brand and model or year of manufacturing, etc.)
  xiii. Any answer to existing security questions
e. Other categories include any other information that both sharing party and receiving party know but is not necessarily public knowledge. Especially information that the receiving party shared with the sharing party when they initiated contact for a transaction.

The information must be known by both the sharing party and receiving party, cannot be guessed by anyone else, and has to be stable.

Encrypted Files

All of the same logic related to the encrypted payload applies to support for files.

The system provides a way to encrypt multiple files that can be downloaded from the same secure URL. These files are not stored unencrypted in the verification system back-end but encrypted by the same key as the encrypted payload that is not known by the back end. As such, an attacker of the verification system back-end would not be able to gather any useful information.

Gather Statistics

The verification system verifies and provides access to secure information as part of a Zero Knowledge architecture, and due to its centralized nature, it can also provide additional information to the users of the verification system platform. For example:
a. The sharing parties could monitor the usage of the secure information they are sharing, how often they are accessed, and when. For privacy reasons, they could see the unique users in a privacy-aware way protecting the receiving party based on hashed IPs and overall geo-location, for example. They could check historical data and if the usage pattern fits with the intent of the wire (long or short-term bank information).
b. The receiving parties use the verification system to make sure the wiring information is legitimate, and the system will provide all the necessary tools to help build this confidence. For example, the receiving party could see when the company has been established, and the secure URL has been set up. The longer, the better. They could also see how many times the URL has been verified by different users. A wire information that has been set up in the past few days and barely used is probably more at risk for fraud than a wire information that was set up a year ago and has been used dozens of times every week by a reputable company.
c. As a service, the unique URL can be changed to a vanity URL to make it more convenient and more easily recognizable by both sharing party and receiving party. It is understood that leveraging this may reduce the security of the URL in some cases. Here are some examples with various trade-offs:
  iii. Option A: www.safe-wire.com/en/<name>-a7d32de8
    3. Where <name> represents the company, account, property, syndication, or deal name. This option A is as secure as before as the unique identifier a7d32de8 still cannot be guessed.
  iv. Option B: www.safe-wire.com/en/<name>
    4. Where <name> represents the company, account, property, syndication, or deal name. Option B is much less secure than Option A. An attacker could guess it, and this opens the door to brute force attack. However, this could be a short URL used to present the company itself (with no secure information to get access to).

A sharing party may decide to lock the <name> in the verification system to further prevent spoofing. The sharing party could add a list of keywords in the verification system platform to prevent the creation of corresponding vanity URLs. For example, the Cali Bank could decide to lock the terms "cali" and "bank" together or a combination of them, thus preventing anyone from spoofing the Cali Bank through a vanity URL. For example, "calibank", "cali-bank", "<anytext>calibank<anytext>," "bankcali", etc. would be rejected by the verification system as part of the vanity URL creation unless it is initiated by the Cali Bank itself. However, the verification system platform must have full discretion in terms of allowing specific keywords. Some keywords like "Bank," "Wire," "Safe," "LLC," etc. alone would not be good candidates to be locked by a sharing party as it would prevent other sharing parties with similar needs from leveraging their own vanity URLs, or some terms could even be used as a phishing or spoofing vector.

Customization of Secure URL Page

To further build trust in the information provided by the verification system platform to the receiving party, the sharing party should be able to customize the page that is displayed under the secure URL. Branding could be provided, such as color theme, logo, and additional information that could be accessible even without the secure compound key. The branding would be shared between multiple secure URLs of the same sharing party.

Company Information

As part of the branding, the concept of a company is introduced. The company would represent a collection of sharing party accounts with a common set of secure URLs being shared. This would enable the company to use the verification system at scale.

Mechanisms would be established to ensure that an attacker cannot take over a sharing party and create fraudulent banking information. A quorum model can be defined to significantly reduce the chance of these attacks happening or for a company to lose access to their own accounts.

Verification and display checkmarks to make the receiving party more comfortable with the verified information.

To further increase the receiving party trusting the information by the verification system and the sharing party, the verification system could display information that pertains to the steps used by the verification system to verify the authenticity of the sharing party, such as:

a. Authenticity of the sharing party:
  i. The verification system platform team physically met the sharing party.
  ii. The verification system platform team met the sharing party through a Video Conference or had a phone call to verify the identity.
  iii. The verification system platform team verified the LLC organization paper, EIN, and State information.
  iv. The sharing party got verified by a 3rd party website (like ID.me and other similar websites).
  v. The verification system platform team received and verified a copy or scan of the Passport, Driving License, Personal ID, or any other Identification document used in the industry. Notarization, legalization, apostille, bank medallions, etc. may also be requested.

b. Authenticity of the Bank Account:
  v. The verification system platform received a void check matching the banking information,
  vi. The verification system platform was able to independently verify the bank account.
  vii. The sharing party sent some funds to the verification system platform in escrow as a guarantee. This would be a good deterrent against fraud, especially if the sum is significant. The money could be sent with a check/ACH/wire with the same banking information or through a Blockchain transaction with the escrow account owned by the verification system platform.
  viii. The verification system platform team received information/insurance proving the authenticity of the sharing party and bank information through a 3rd party company (like fraud prevention, insurance, a cybersecurity company, etc.)

The verification system platform could display the various mechanisms used to verify the authenticity of the sharing party and/or the Bank Account. This will offer more assurance for the receiving party of the validity of the verified information, especially if more proofs of authenticity are shared.

As an acceptance for the creation of banking information (the initial N bank information, or even for every single one) to be shared between a sharing party and the receiving party, the verification system could define additional and specific requirements to meet in terms of the authenticity of the sharing party and the bank account.

Templates

Sharing parties are expected to re-use the same combination of the secure URLs multiple times. The secure URLs could be based on the same banking information, company information, and logo.

A verification system platform could provide a mechanism for the sharing party to define and re-use pre-filled templates and not be forced to use the pre-selected templates. Using templates allows a company to guarantee the same quality bar with minimum employee training, even when used by multiple employees.

The verification system platform could provide a way for a sharing party to define a compound key for the secure URL based on the compound fields as described (phone number, birth date, social security number, etc.). As the sharing party selects the fields of their interests, (e.g., birth date, zip code) the verification system platform could indicate to the sharing party the strength of the compound key against brute force attacks.

a. Using birth dates as an example, commonly composed in a format MM/DD/YYYY (using the standard US format but could be DD/MM/YYYY or YYYY/MM/DD). It has 8 digits, thus could be considered a 1 combination in 100 million, but in reality, it is much lower. DD can only be between 01 and 31, MM can only be between 01 and 12, and the most common dates would be between 1900 and the current year+30 years (end year for a 30-year loan, for example). Not accounting for months that only have 28/29/30 days and using 2060 as the maximum year, there are fewer than 60,000 birth date combinations which makes it a weak key by itself. (31*12*160=59,520).

b. There are fewer than 42,000 ZIP codes in the United States, and they can be guessed in some circumstances. This would be a weak key by itself.

c. Combining the two fields, almost 2.5 billion combinations exist, which is a stronger key.

d. Email can have a wide range of values, especially if the '+<suffix>' is added and "." to randomize the email itself. This can increase flexibility between the sharing party and the receiving party.

e. Despite using 9 digits, the Social Security numbers before June 2011 were not randomized, so an attacker could brute force them more easily. This would make a weak-strength key. Using only the last 4 digits of the social security number would make it a very weak key, too.

f. The street name and number for the receiving party could be a weaker key as it could be found based on information found on the Internet, but a street address for a future house/investment property would be much stronger as it could not be as easily guessed.

The more fields added, the stronger the compound key is, and therefore by showing the overall strength of the compound key to the sharing party, the sharing party could make wise choices in terms of the compound key for the receiving party to access the secure data from.

To strengthen the key further against brute-force attacks, the system could increase the complexity of the hashing method to slow down attacks. This method has an impact on the usability for the sharing party (once) and especially the receiving party though (each receiving party), as the encryption/decryption process would be N times slower (10 times slower if the system iterates from 600,000 iterations to 6,000,000 iterations, for example) so this will not enable a massive scale against brute-force attacks. Some algorithms could be employed to defeat brute-force attacks leveraging GPU or ASIC.

The sharing party could duplicate an existing secure URL by simply providing the correct compound key in order to decrypt the encrypted payload data and recreate a new secure URL with the same compound key or even a new one while keeping the same payload or modifying it.

The sharing party could duplicate an existing secure URL (or one of its predefined templates), and create several secure URLs, one for each receiving party, by just listing the personal information for each receiving party, either through a web portal, a CSV file mapping each portion of the compound key, etc. And if the email was provided, the receiving party could then directly receive the information about the secure URL, optionally cc'ing/bcc'ing the sharing party.

Redundancy for Additional Security

To further increase security, the system could have the client talk to two different backends instead of a single one. The backends would be in two completely different environments and potentially even two different implementations. The system would not be required to reproduce all the features there, only the mapping between the secure URL and an additional key. The SALT and the encrypted payload could be split between the two servers, for example, with a similar random XOR pattern discussed earlier. This means that to brute force the encrypted payload through the backend, the attacker would have to attack both backends.

To further harden the verification system platform, the random XOR pattern could be regenerated regularly, and the encrypted payload could be updated accordingly. Thus, the attacker would need to have access to both backends simultaneously to be able to reconstitute the encrypted payload to be brute force.

Subscription

The verification system platform may offer a free and premium model with subscriptions based on the features used by the sharing party and/or the receiving party.

Leverage Fraud Prevention Insurance

Some Fraud Prevention Insurance companies could leverage the verification system platform to reduce the potential for fraud, which in return will reduce their fees. As an example, insurance companies could force the sharing party to use the verification system platform. On the receiving party's side, the verification system platform could connect with the Fraud Prevention insurance company to validate that the receiving party, indeed, verified the secure banking information. This could be done, for example, through a specific Access Code/OTP shared by the Fraud Prevention Insurance Company to the receiving party that would be entered by the receiving party in the verification system UI, which in return would be sent to their backends for verification. This could be generalized with any other mechanism that allows verifying the identity of the receiving party to the Fraud Prevention insurance company (letter, phone call, SMS, email, etc.).

Figure 2:
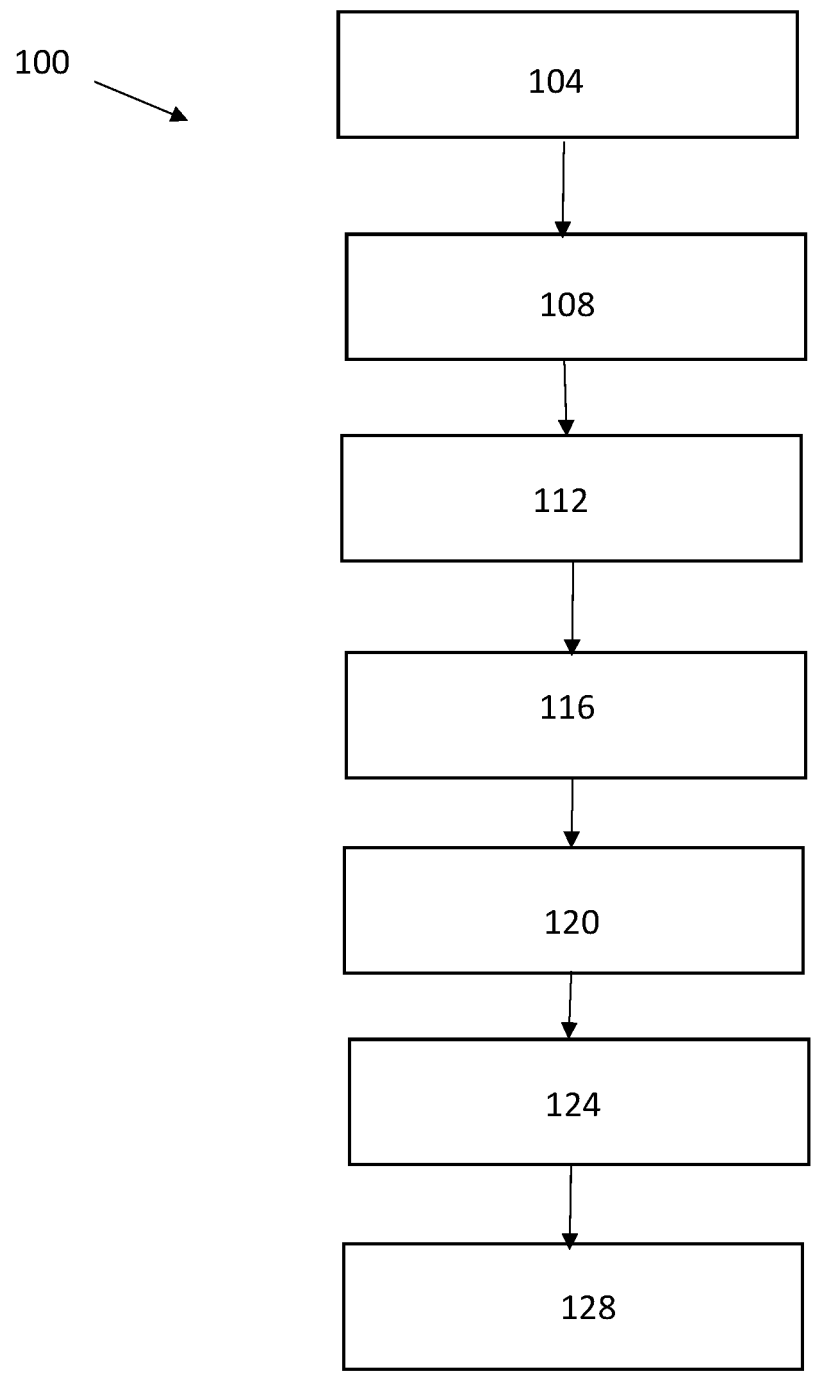
FIG. 2 is a flowchart showing a method for using the wire verification system according to the present invention.

Referring to FIG. 2, there is shown a flowchart showing a method 100 of using the system for wire verification. The method 100 includes executing a preliminary transaction 104 wherein at least one datum is used in the preliminary transaction wherein the at least one datum is known by the sharing party and the receiving party and wherein the at least one datum is absent from the verification system. The method 100 includes initiating a primary transaction 108 and generating 112 a URL associated to a public key. The method 100 includes the delivery system requesting the primary transaction 116 and the receiving party confirming 120 accuracy of the at least one datum. The method includes providing 124 at least one additional layer of security and allowing 128 the primary transaction to occur.

Figure 3:
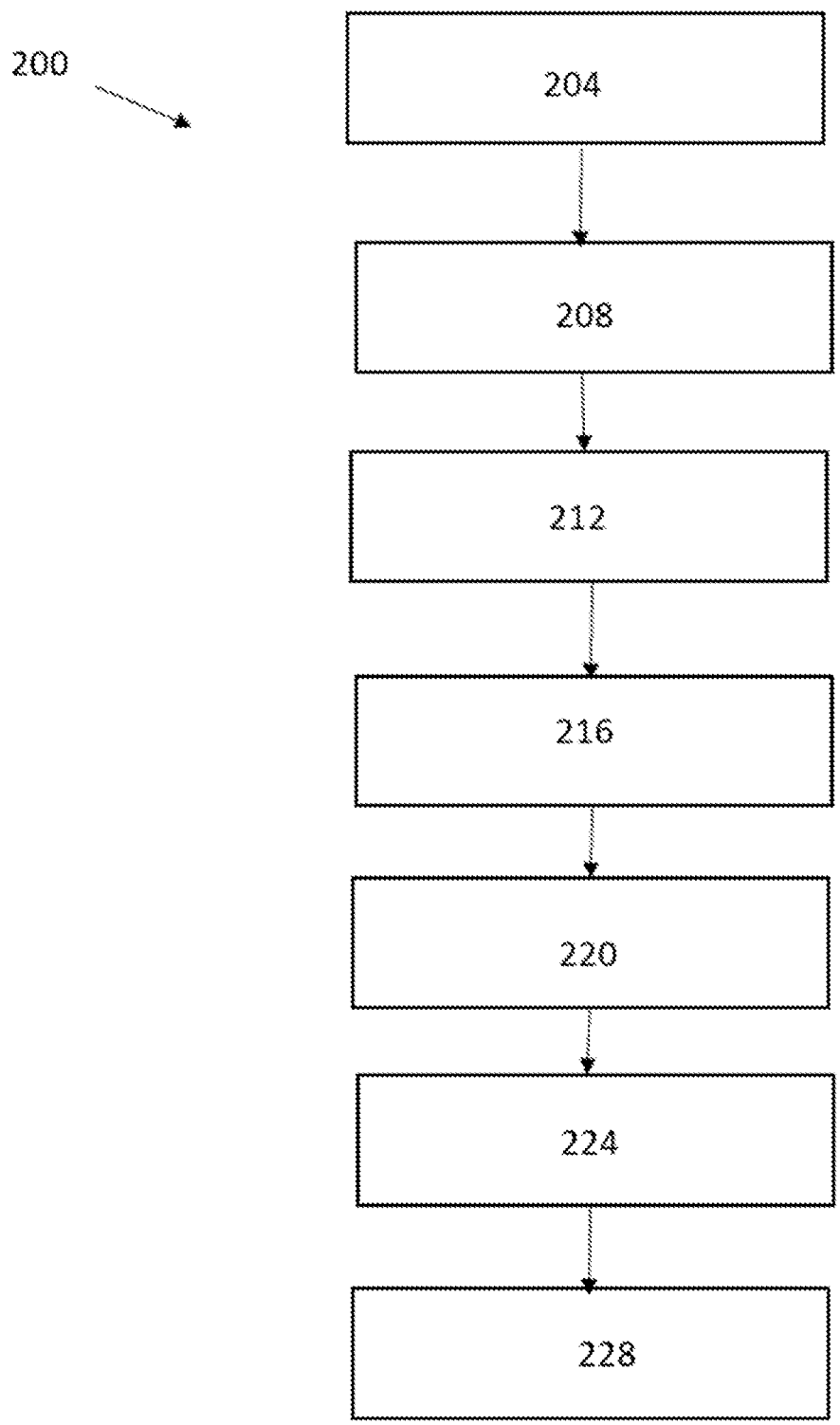
FIG. 3 is a flowchart showing another method for using the wire verification system according to the present invention.

In another embodiment of the present invention shown in FIG. 3, a method 200 of using the wire delivery system includes the sharing party registering 204 the information and a payload on the verification system, the payload for encryption with fields used in a compound key. The method includes the verification system returning 208 a secure URL and verification code to the sharing party and the sharing party sharing 212 the secure URL with the receiving party. The secure URL includes the verification code and fields included in the compound key. The method 200 includes the receiving party accessing 216 the URL and entering 220 the fields and the receiving 224 party verifying the verification code and the information. The secured data verification is complete for any funds to be transferred 228 or other required transaction to be completed.

Figure 4:
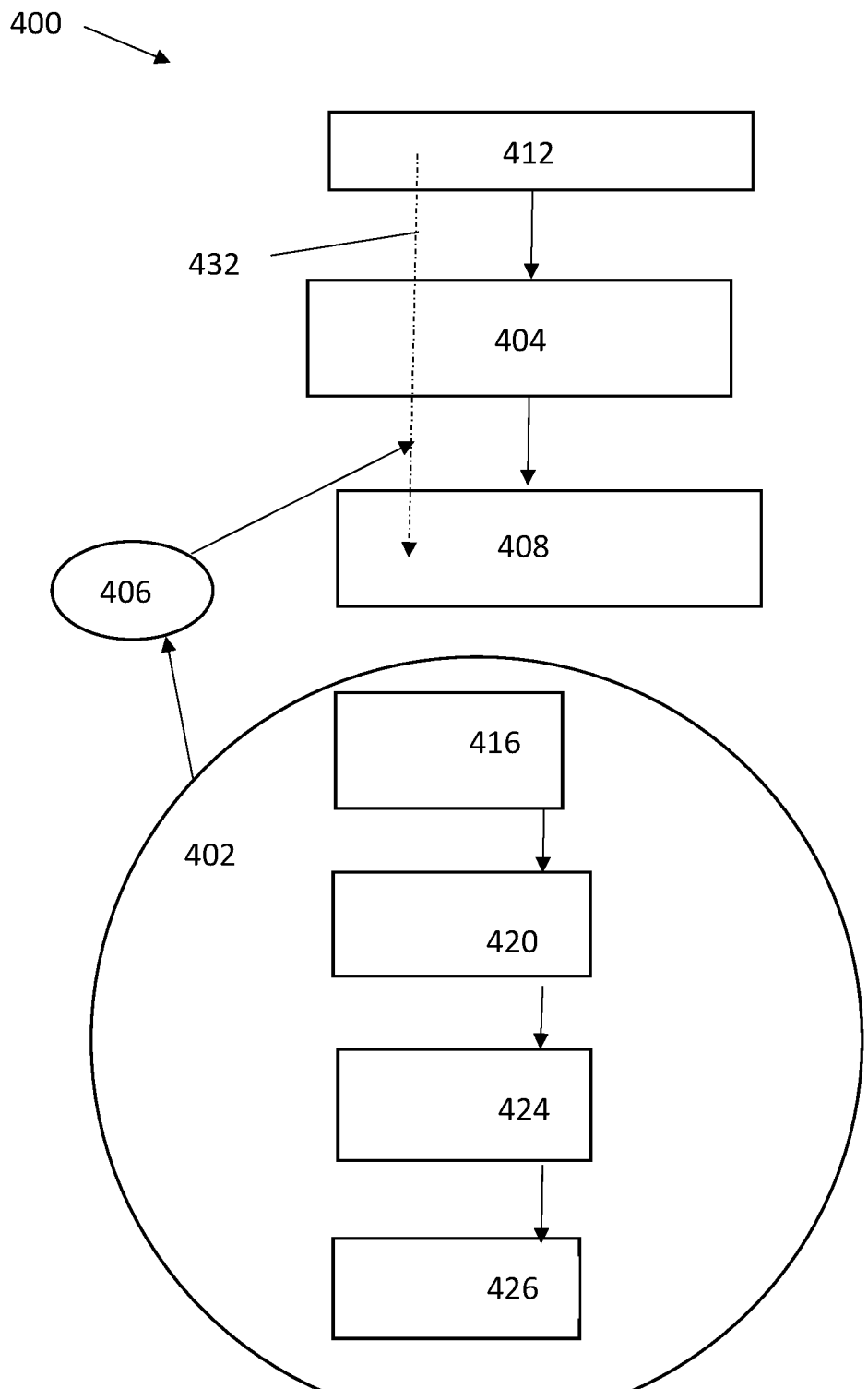
FIG. 4 is a system for using the wire verification system according to the present invention.

Another embodiment of the present invention is a system of fraud prevention to share secure information 412 through steps 402 using an ordinary key 406 to allow transfer 432 of the information 412 as shown in FIG. 4. The system 400 includes a sharing party 404 for sharing information in a secure manner and a receiving party 408 securely accessing the information. The sharing party 404 begins by registering 416 the information 412 on a secure delivery system using a security datum. The secure delivery system returns 420 a secure URL and an optional verification code for the sharing party 404 to share with the receiving party 408. The secure delivery system does not store the security datum or a transformation of the security datum. The receiving party 408 connects 424 to the secure URL. The receiving party enters 426 the datum shared or known by both the sharing party 404 and the receiving party 408. The receiving party 408 may access an additional encrypted payload provided by the sharing party which the receiving party can decrypt using the security datum generated from the ordinary key 406. The receiving party 408 may verify that the verification code and information match in the data. After step 426, the role of the sharing 404 and receiving 408 parties could be swapped to allow for secure bidirectional sharing of information.

In some embodiments the method or methods described above may be executed or carried out by a computing system including a tangible computer-readable storage medium, also described herein as a storage machine, that holds machine-readable instructions executable by a logic machine (i.e., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized that the scope of this invention is much broader than presented by the claim. It is intended that broader claims will be submitted in an application that claims the benefit of priority from this application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A secure method to share and verify banking information electronically to send a wire transfer using at least two computer systems and the method comprises sharing of information between at least two computer systems using a computer network, the method further comprising: a sharing party having a sharing party computer system and the sharing party computer system having a display subsystem, tangible computer-readable storage medium and a processor and the sharing party computer system having information to share; a receiving party computer system having a receiving party computer system and the receiving party computer system having a display subsystem, tangible computer-readable storage medium and a processor and the receiving party computer system being enabled to receive shared information from the receiving party computer system and the receiving party computer system having a verification system for allowing the receiving party computer system to securely verify and access the information received from the sharing party computer system, the verification system including: a plurality of layers of security for providing resilience to adversarial attacks wherein the plurality of layers of security excludes the information shared by the sharing party computer system shared; wherein the verification system generates a URL associated to a public key, the public key generated from data known by the receiving party computer system and the sharing party computer system, the data being transformed to generate an encryption key; and wherein the verification system is obfuscated to enhance security.

2. The secure method to share and verify banking information electronically according to claim 1 wherein the verification system incorporates random data in the public key.

3. The secure method to share and verify banking information electronically according to claim 1 wherein the verification system is split to enhance security.

4. The secure method to share and verify banking information electronically according to claim 1 wherein the verification system tracks and provides an output of statistical information regarding use conditions.

5. The secure method to share and verify banking information electronically according to claim 1 wherein the verification system is integrable with fraud prevention insurance organizations for enhanced security of transactions.

6. The secure method to share and verify banking information electronically according to claim 1 wherein the verification system achieves heightened security for online transactions.

7. The secure method to share and verify banking information electronically according to claim 1 wherein the verification system facilitates verification conducted by the receiving party by inputting known information to the verification system, incorporating known information utilizing 2nd factor authentication to the system and incorporating branding and information known to both the sharing party and receiving party but not by the verification system.

8. The secure method to share and verify banking information electronically according to claim 1 wherein the verification system utilizes a crawler to simulate behavior of the verification system.

9. The secure method to share and verify banking information electronically according to claim 1 wherein the verification system carries additional payload of information sent by the sharing party for the receiving party to verify.

10. The secure method to share and verify banking information electronically according to claim 1 wherein the verification system layers with 2nd factor authentication to enhance security.

11. The secure method to share and verify banking information electronically according to claim 1 wherein the verification system is stored in a blockchain for enhanced security.

12. The secure method to share and verify banking information electronically according to claim 1 wherein the URL is generated with an associated salt to further enforce security.

13. The secure method to share and verify banking information electronically according to claim 1 which implements Zero Knowledge architecture to enhance security of the sharing of the information.

14. A method of using the secure method to share and verify banking information electronically according to claim 1, the method comprising: executing a preliminary transaction wherein at least one datum is used in the preliminary transaction wherein the at least one datum is known by the sharing party computer system and the receiving party computer system and wherein the at least one datum is absent from the verification system; initiating a primary transaction; generating a URL associated to a public key; the delivery system requesting the primary transaction; the receiving party computer system confirming accuracy of the at least one datum; providing at least one additional layer of security; and allowing the primary transaction to occur.

15. A method of using the secure method to share and verify banking information electronically according to claim 1, the method comprising: the sharing party registering the information and a payload on the verification system, the payload for encryption with fields used in a compound key; the verification system returning a secure URL and verification code to the sharing party; the sharing party sharing the secure URL with the receiving party, including the verification code and fields included in the compound key; the receiving party accessing the URL and enters the fields; and the receiving party verifying the verification code and the information.

16. A system of fraud prevention using secure method to share and verify banking information electronically to send a wire transfer using a fraud prevention system that shares secure information through an ordinary key, the system comprising: a sharing party computer system for sharing information in a secure manner; a receiving party computer system securely accessing the information; wherein the sharing party computer system registers the information on a secure delivery system having fields used to create a security datum; wherein the secure delivery system returns a secure URL and an optional verification code for the sharing party computer system to share with the receiving party computer system; wherein the secure delivery system does not store the security datum or a transformation of the security datum, and wherein the receiving party connects to the secure URL, enters the datum shared or known by both the sharing party computer system and receiving party computer system.

17. The system of fraud prevention having the secure delivery system according to claim 16 wherein the receiving party computer system accesses an additional encrypted payload registered by the sharing party computer system which the receiving party can decrypt using the generated security datum from the datum shared or known by both the sharing and receiving parties, and optionally verify that the verification code and information match, wherein after the verification, the role of the sharing party computer system and receiving party computer system could be swapped to enable secure bidirectional sharing of information.

\* \* \* \* \*